C. KOONS.
ANIMAL-TRAP.

No. 185,110. Patented Dec. 5, 1876.

WITNESSES:

INVENTOR:
C. Koons
BY
ATTORNEYS.

UNITED STATES PATENT OFFICE.

CORNELIUS KOONS, OF YORK ROAD, MARYLAND.

IMPROVEMENT IN ANIMAL-TRAPS.

Specification forming part of Letters Patent No. 185,110, dated December 5, 1876; application filed October 16, 1876.

*To all whom it may concern:*

Be it known that I, CORNELIUS KOONS, of York Road, in the county of Carroll and State of Maryland, have invented a new and Improved Animal-Trap; and I do hereby declare that the following is a full, clear, and exact description of the same, reference being had to the accompanying drawing, forming part of this specification, in which—

Figure 1:
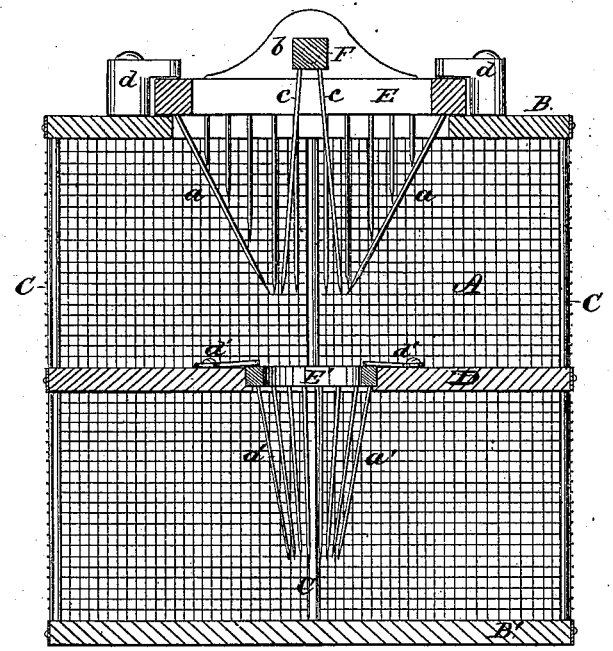
Figure 2:
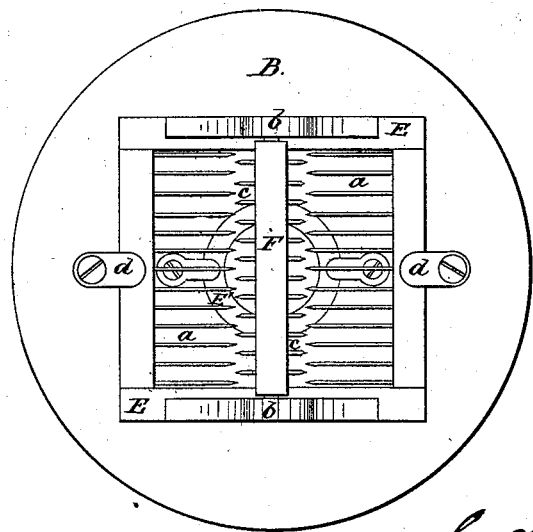

Figure 1 is a vertical central section; Fig. 2, a plan view.

The object of my invention is to provide a simple, noiseless, and effective rat-trap, which shall be always set, and whose capacity for catching rats shall, in consequence, be only limited by the size of the same. To this end my invention consists in a drum-shaped two-compartment cage, made of wire-cloth, to the upper compartment of which access is had through a square tapering inlet, formed by inwardly-projecting pointed wires, having suspended in the center a swinging gate composed of pointed wires; and it also consists in the particular construction and arrangement of the upper inlet and compartment with a lower compartment having a second inlet, as hereinafter more fully described.

In the accompanying drawing, A represents the wire-cloth cage, formed around the heads B B' into a cylindrical or drum shape, and braced by vertical stay-rods C, which enter the said heads and are securely attached to the same, so as to render the cage stiff and substantial. The said cage rests upon its bottom end B', and is divided into two compartments by a partition, D, into each of which compartments access is had by the rats through peculiarly-arranged inlets. To form the first or upper inlet a square hole is cut in the center of the head B, and above the same is fitted a square frame, E, provided with downwardly-projecting pointed wires a, arranged inclinedly upon two sides, and converging downward to form a tapering inlet. In bearings b upon the top of the end bars of the frame E is journaled a shaft or cross-bar, F, armed with two diverging rows of downwardly-projecting pointed wires, c, which form a swinging gate suspended centrally between the pointed wires of the tapering inlet. This gate permits the rats to push it to one side and have easy ingress to the interior, but, by the action of gravity, it immediately swings back to its central position in the mouth of the inlet, to prevent the rats from escaping. The wires of this gate are made slightly shorter than those of the inlet, in order to prevent the rat from escaping by pushing it aside with his nose. The frame, with its gate and inwardly-projecting wires, as thus described, is arranged upon the top of the head B so as to project inwardly through the opening, in which position it is securely held in a detachable manner by the buttons d, pivoted to the head so as to turn over the edges of the frame E to secure it, or be turned the other way to allow its removal. The lower inlet, leading into the lower compartment from the upper one, is composed simply of inwardly-projecting converging pointed wires a', arranged in a circular metallic frame, E', so as to form a tapering inlet, the said frame E' being held detachably in place by buttons d', after the manner of the one first described.

In making use of this rat-trap, bait of any kind is placed in the upper and also in the lower compartment, that being selected which is most toothsome to his ratship, and the trap is then perpetually set for as many rats as the cage will hold. The rats, without hesitation, pass down into the first compartment, for the reason that the gate, by swinging to one side, accommodates itself to the size of the rat, and does not squeeze him. Once in, he soon becomes anxious to get out, and becoming bewildered by his unavailing efforts, is willing to squeeze through any orifice. He consequently passes down into the lower compartment, and is there securely disposed of. The upper compartment thus catches the rats, while the lower one disposes of them by allowing them to vacate the upper one, and thus make room for more rats. After the cage is full of rats the latter are removed by loosening the buttons d d' and taking out the detachable frames E E' with their wires.

The advantages of the trap as thus described are that its capacity is only limited by its size, it is noiseless, accommodates itself to any size of rat or mouse, is always set, and, being made of wire-cloth, one rat acts as a decoy for others, is not liable to get out of order, and is, as proven by repeated experiments, thoroughly efficient for the purpose, the rats showing no hesitation in venturing in past the swinging gate.

In attaching the wire-cloth to the heads B B' and partition D, bands or hoops of metal are used, which may be of sufficient width to prevent the bait from being thrown off from the floors of the compartments through the wire netting.

Having thus described my invention, what I claim as new is—

1. The combination, with the tapering inlet to an animal-trap, formed by inwardly-projecting pointed wires, of a pivoted swinging gate arranged centrally within said tapering inlet, substantially as and for the purpose described.

2. The drum-shaped trap, having a partition, D, forming two compartments, one for catching and the other for receiving or disposing of the rats or other animals, provided with detachable frames carrying inwardly-converging pointed wires, for the removal of the animals, substantially as described.

3. The tapering inlet, composed of pointed wires and having a swinging gate, substantially as described, in combination with a wire cage having a partition, D, forming two compartments, and a second detachable frame carrying pointed wires and forming a tapering inlet to the lower compartment, substantially as described, and for the purpose set forth.

CORNELIUS KOONS.

Witnesses:
F. MEHRING,
S. WEANT.